United States Patent
Sharma et al.

(10) Patent No.: US 10,419,585 B2
(45) Date of Patent: Sep. 17, 2019

(54) DYNAMICALLY SURFACING UI CONTROLS

(71) Applicant: Adobe Inc., San Jose, CA (US)

(72) Inventors: Vikas Sharma, Lucknow U.P. (IN); Nishant Kumar, Siliguri (IN)

(73) Assignee: Adobe Inc., San Jose, CA (US)

( * ) Notice: Subject to any disclaimer, the term of this patent is extended or adjusted under 35 U.S.C. 154(b) by 284 days.

(21) Appl. No.: 15/191,211

(22) Filed: Jun. 23, 2016

(65) Prior Publication Data

US 2017/0374178 A1    Dec. 28, 2017

(51) Int. Cl.
*H04L 29/06* (2006.01)
*H04L 29/08* (2006.01)
*G06F 9/451* (2018.01)
*G06F 8/38* (2018.01)

(52) U.S. Cl.
CPC .............. *H04L 67/36* (2013.01); *G06F 9/453* (2018.02); *G06F 8/38* (2013.01)

(58) Field of Classification Search
CPC ...................................................... H04L 67/36
See application file for complete search history.

(56) References Cited

U.S. PATENT DOCUMENTS

| | | | | |
|---|---|---|---|---|
| 6,298,157 B1* | 10/2001 | Wilensky | ............... | G06T 3/403 |
| | | | | 382/199 |
| 2004/0196296 A1* | 10/2004 | Lewis | ................... | G06T 15/503 |
| | | | | 345/611 |
| 2017/0046482 A1* | 2/2017 | Kuo | ...................... | G06F 19/321 |

* cited by examiner

*Primary Examiner* — Adnan M Mirza
(74) *Attorney, Agent, or Firm* — Keller Jolley Preece

(57) ABSTRACT

Methods and systems for dynamically surfacing user interface controls in a workflow. In particular, one or more embodiments determine which steps of a workflow to display with the workflow. One or more embodiments assign weights or scores to each step of the workflow based on whether the step is a required step or an optional step. One or more embodiments use the assigned weights to determine which steps to display with the workflow in a graphical user interface based on whether the assigned weights meet a predetermined threshold. Additionally, one or more embodiments track user interactions with commands in the client application and increase weights of steps associated with the commands to dynamically display steps when the increased weights of the steps meet the predetermined threshold.

20 Claims, 8 Drawing Sheets

DYNAMICALLY SURFACING UI CONTROLS

BACKGROUND AND RELEVANT ART

Many applications, such as those used for content creation or modification, allow users to perform a variety of operations to obtain a specific result. For example, during content creation and/or modification, users often perform a plurality of steps, referred to collectively as a workflow, to achieve a particular content output. To illustrate, a user can modify images and photographs using a variety of different tools within an image editing application. A workflow can include any number of required steps to achieve a desired output, and can also include optional steps that enhance the final output of the workflow.

Conventional applications typically provide all or many of the options for performing commands for editing content to users within a graphical user interface. Due to the large number of possible options and commands that are available, displaying all of the options the first time a user attempts to perform the workflow can be confusing to the user. Additionally, many conventional applications have naming conventions that do not explicitly describe what the options are, making it difficult for users to identify exactly which options to choose to perform the steps of a given workflow.

To make it easier for users to find options for performing different workflows, some conventional applications group related options together. Specifically, conventional applications often group related options into menus, submenus, and toolbars that allow users to more easily find the options and identify options that are related to each other. Other conventional applications group all of the options associated with performing steps in a workflow into a workflow-specific toolbar or menu. Grouping related options into menus/toolbars or even into workflow-specific toolbars can potentially present a plurality of options with which a user is unfamiliar, resulting in continued confusion for a user and difficulty completing a workflow.

SUMMARY

Introduced here are methods and systems for providing dynamic user interface controls within an application. In accordance with one or more disclosed embodiments, an application management system controls the display of steps associated with a workflow in a client application. Specifically, the application management system assigns weights to steps in a workflow and presents the steps based on whether the assigned weights meet a predetermined threshold. The system can initially assign weights to display required steps of the workflow while hiding optional steps of the workflow. Thus, the application management simplifies the workflow displayed to the user to allow the user to more easily learn the required basic steps of performing the workflow.

As a user performs commands within the client application (e.g., by using tools or performing steps in workflows), the application management system dynamically modifies the steps shown in the workflow. Thus, as the user performs a command associated with a hidden step in the workflow, the application management system increases the weight assigned to the step for the workflow. When the assigned weight for the hidden step meets the predetermined threshold, the application management system displays the previously hidden step when displaying the workflow. As a result, the application management system provides a guided workflow experience for a user by gradually increasing the number of steps displayed to the user in the workflow as the user gains more experience with the underlying commands of the workflow.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
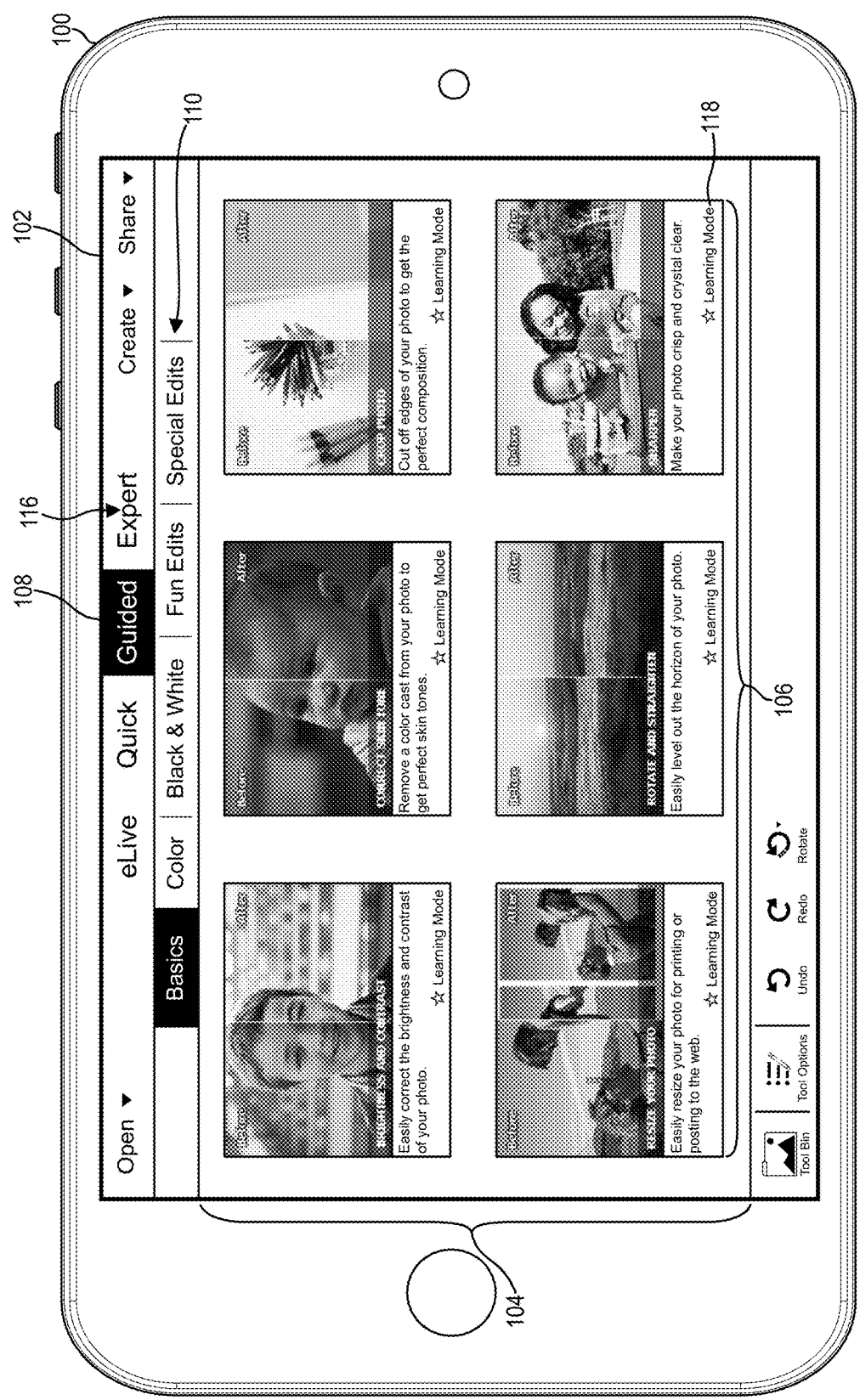
FIG. 1 illustrates an example graphical user interface for providing workflow options associated with a client application in accordance with one or more embodiments.

One or more embodiments of the present disclosure provide an application management system that provides guided workflow experiences. In particular, the application management system determines which steps of a workflow to display with the workflow. The application management system assigns weights or scores to each step of the workflow based on whether the step is a required step or an optional step. The application management system uses the assigned weights to determine which steps to display with the workflow in a graphical user interface. Displaying workflows based on assigned weights of corresponding steps initially provides simplified workflows to users when the users first start using the workflows and underlying commands.

The steps in a workflow are associated with underlying commands of the client application that cause the client application to perform one or more operations. As a user becomes familiar with the commands corresponding to hidden steps of a workflow, the application management system increases the weights of the hidden steps. When the weight of a step increases to meet the predetermined threshold, the application management system begins displaying the previously hidden step with the workflow. By initially hiding steps of a workflow and displaying the steps as the user uses the underlying commands, the application management system gradually increases the complexity of the workflow in accordance with the user's familiarity with the steps.

In one or more embodiments, the application management system allows a user to select a workflow from a plurality of workflows in a client application. For example, the application management system allows a user to select a predefined workflow to obtain a specific result using the client application. The predefined workflow can include a plurality of steps associated with commands in the client application to create, edit, or otherwise interact with content. For instance, a predefined workflow includes at least one required step for completing the workflow and at least one optional step that further enhances or modifies the output of the workflow.

As mentioned, the application management system determines how to display the workflow based on weights associated with the steps in the workflow. Specifically, the application management system determines which steps of the workflow to display with the workflow in a graphical user interface of the client application when a user selects the workflow. For example, the application management system identifies steps of the workflow that are required to complete the workflow and assigns a weight to each required step that meets a predetermined threshold. Additionally, the application management system identify steps of the workflow are not required to complete the workflow and assigns a weight to each optional step that does not meet the predetermined threshold. Thus, the application management system initially provides only the required steps and hides the optional steps when initially displaying the workflow to a new user.

The application management system also tracks use of commands in a client application to determine a user's familiarity with the commands. In particular, the application management system determines whether a user has any experience or has used a particular command by tracking any use of the command in the application. As a user uses a command, the application management system increases a weight or score assigned to the command. For instance, the application management system can track the use of commands associated with optional steps in one or more workflows and increase the assigned weight of the corresponding optional steps in the workflows as the user uses the underlying commands.

As the weight assigned to a step in a workflow increases based on the use of the underlying command, the application management system dynamically determines whether to display the step in response to a request to display the workflow. Specifically, the application management system determines whether to display a previously hidden step by comparing the increased weight of the step to the predetermined threshold. If the increased weight meets the predetermined threshold, the application management system displays the previously hidden step the next time the system displays the workflow.

As described herein, the application management system provides advantages over conventional systems. The application management system dynamically modifies displayed options in workflows to improve the usability of the workflows for users. By dynamically adjusting the number of steps shown in a workflow, the application management system introduces a workflow to a user by providing fewer steps initially and then increasing the number of available steps as the user becomes more comfortable with the commands associated with the workflow. Thus, the application management system declutters the user interface by removing steps from workflow displays. One will appreciate that decluttering the user interface can overcome the common problem of limited space when using a handheld computing device, such as a mobile phone or tablet. Additionally, the application management system reduces the computational processing required to display the steps in a workflow in the client application. In particular, providing less steps in the workflow, allows the application management system to load a workflow faster.

FIG. 1 illustrates a client device 100 that includes a view provided by a client application 102 to facilitate content editing. In particular, FIG. 1 illustrates a user interface of the client application 102 that allows a user to view, create, and/or edit content, such as for example, digital photographs, digital images, digital videos, application user interfaces, or websites. For example, the client application 102 can include photo/image editing software that allows a user to edit photographs or images using a plurality of tools.

As stated, FIG. 1 illustrates a client device 100 for using the client application 102. In one or more embodiments, the client device 100 includes a handheld client device. As used herein the term "handheld device" refers to a device sized and configured to be held/operated in a single hand of a user. For example, the client device 100 can include a smartphone, a tablet computing device, or other mobile computing device that allows the user to perform steps in one or more workflows of a client application 102. To illustrate, the client device 100 of FIG. 1 includes a tablet computing device that allows a user to interact with a user interface via a touchscreen display. Although the client device 100 of FIG. 1 includes a handheld client device, the client device 100 can be another type of computing device that allows a user to use a client application 102 that includes a plurality of workflows, as described herein.

As mentioned, the client device 100 includes a client application 102 that allows a user to view and edit content, such as images, using a plurality of workflows. As used herein, the term "workflow" refers to one or more steps in a process for achieving a particular result. For example, a workflow can include one or more steps that are associated with commands in computer software. To illustrate, a workflow in photo editing software can include a series of steps that modify one or more characteristics of an input image to obtain an output image that is a modified version of the input image.

In one or more embodiments, as illustrated in FIG. 1, the client application 102 includes a workflow selection interface 104 (or "selection interface"). The selection interface 104 includes a plurality of workflow elements 106 associated with a plurality of workflows. Each workflow element 106 is associated with a workflow for achieving a particular output result for an input image. For example, the selection interface 104 can provide workflows for resizing an image, modifying a color or brightness of an image, cropping an image, changing a focus of an image, or otherwise altering a visual characteristic of an image. According to various implementations, the selection interface 104 can include any type of workflow, as may serve a particular embodiment in accordance with the capabilities of the client application 102.

According to one or more embodiments, the selection interface 104 displays the plurality of workflow elements 106 in a grid in response to a selection of a "guided" tab 108 that provides guided instructions for performing workflows (e.g., including one or more steps and corresponding descriptions of the underlying commands). The grid can include a plurality of workflow elements 106 that allow the user to select a workflow from the plurality of workflows. For example, the user can select a specific workflow from the plurality of workflows by selecting a workflow element 106 that corresponds to the workflow. To illustrate, the user can select the workflow element 106 by performing a touch gesture on the workflow element via the touchscreen.

In one or more embodiments, the client application 102 includes categories of workflows. For example, the client application 102 can include a plurality of selectable tabs 110 or sections in the selection interface 104 that include different categories of workflows. To illustrate, the client application 102 can include a selectable tab for basic workflows, workflows for color images, workflows for black and white images, workflows for repairing/restoring an image, and/or workflows for adding unique filters to the image. Categorizing workflows into separate tabs allows a user to more easily find a workflow for a specific output.

The client application 102 can also include an option 116 to open an "expert" or "advanced" mode or interface in which a user can select individual tools or commands for editing an image. Specifically, the client application 102 allows a user to select individual tools associated with one or more workflows to edit an image in a variety of ways that are not necessarily tied to a single workflow. To illustrate, the "expert" mode allows the user to select tools from one or more dropdown menus or toolbars and perform the associated commands in any order. Thus, the "expert" mode allows a user to perform commands outside of a specified workflow, which typically provides a limited set of operations available to the user.

In one or more embodiments, the selection interface 104 allows a user to determine whether to use a "learning mode" for a workflow. For example, the client application 102 can provide a learning mode for a workflow upon user selection of an option 118 in a workflow element in the grid. The learning mode provides a guided version of the workflow based on the user's experience with the client application 102, as described herein. Specifically, enabling the learning mode can cause the application management system to display only the required steps of a workflow when a user selects the workflow for the first time and/or before the user has used any of the commands associated with the selected workflow.

In one or more embodiments, the application management system enables the learning mode by default. In particular, when a new user first opens the selection interface 104 in the client application 102, the application management system enables the learning mode for each of the workflows in the selection interface 104. For example, because the user is a new user, the user has not previously used the client application 102 or the workflows. The application management system provides the learning modes for each of the workflows in the client application 102 so that the user can have a customized, guided experience performing each of the workflows without being overwhelmed by unfamiliar or complicated options.

Alternatively, the application management system disables the learning modes by default. For example, the application management system imports settings from one or more other client applications related to the client application 102 (e.g., in a suite of applications that includes the client application 102). If the user has set a preference to disable learning modes, the application management system allows the user to perform the workflows without modifying the workflows. Specifically, the application management system obtains the user preferences from a user profile that includes a user ID and information associated with user interactions in the client application.

Figure 2A:
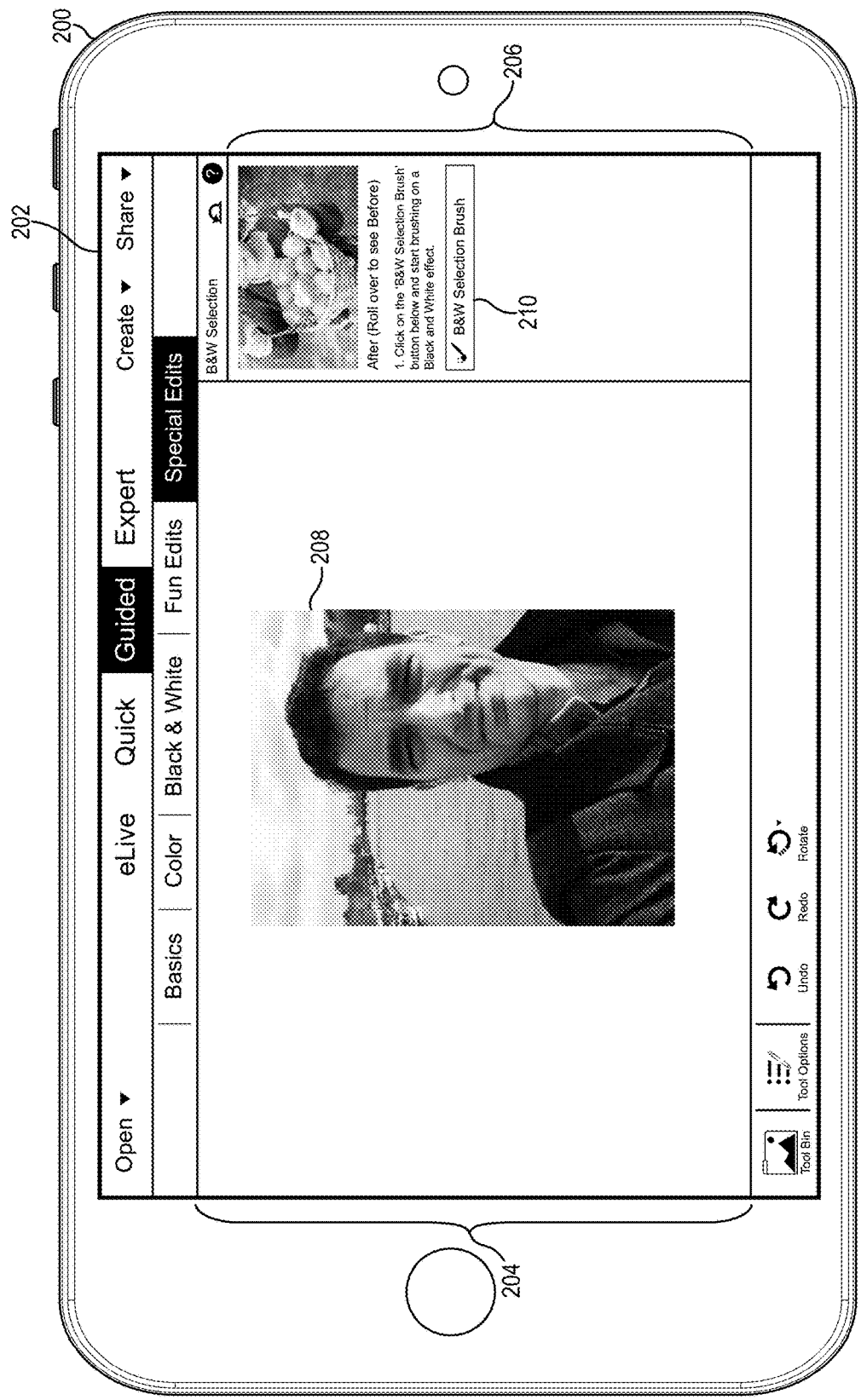
FIGS. 2A-2C illustrate example graphical user interfaces for dynamically modifying a workflow in accordance with one or more embodiments.
Figure 2B:
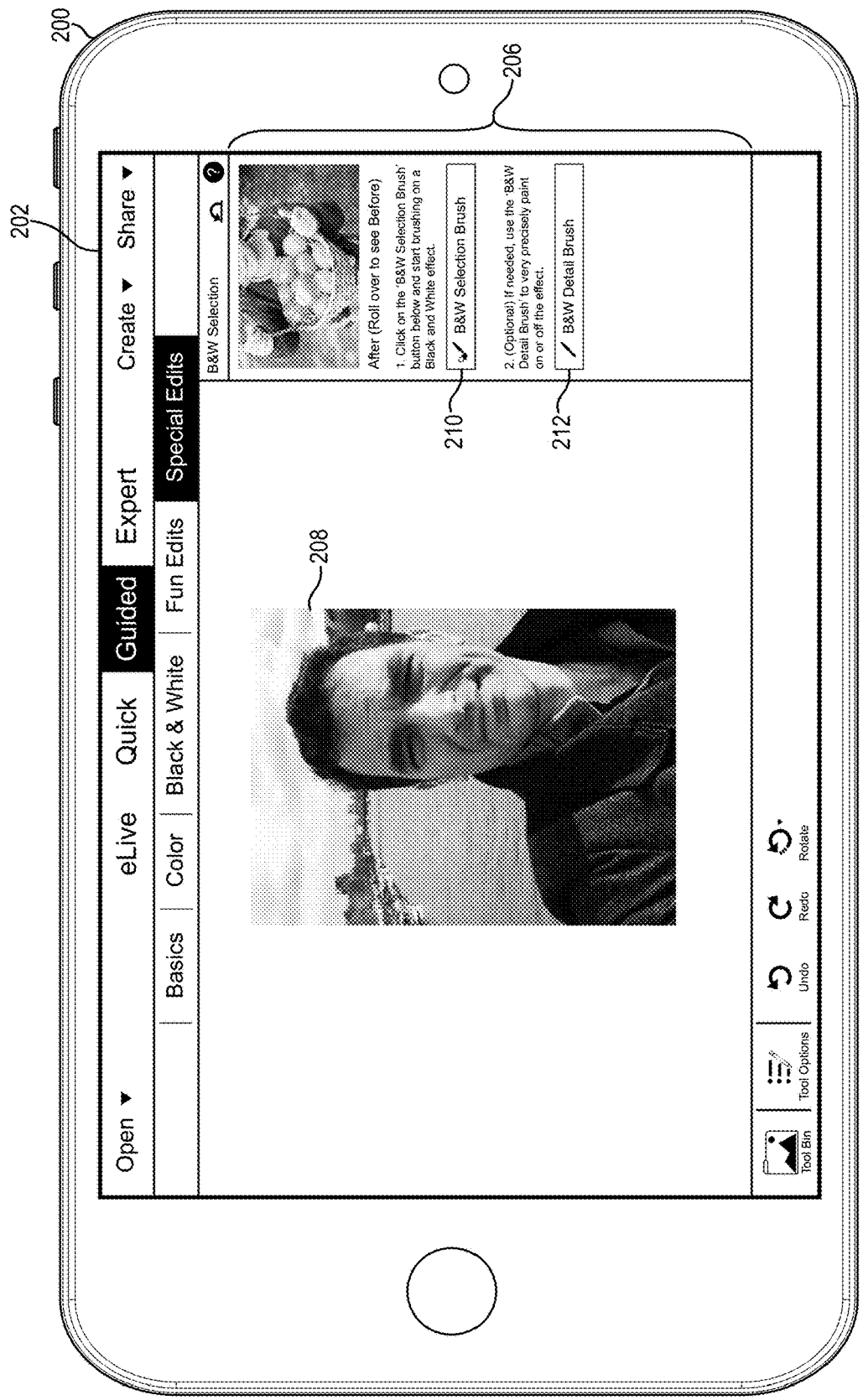
Figure 2C:
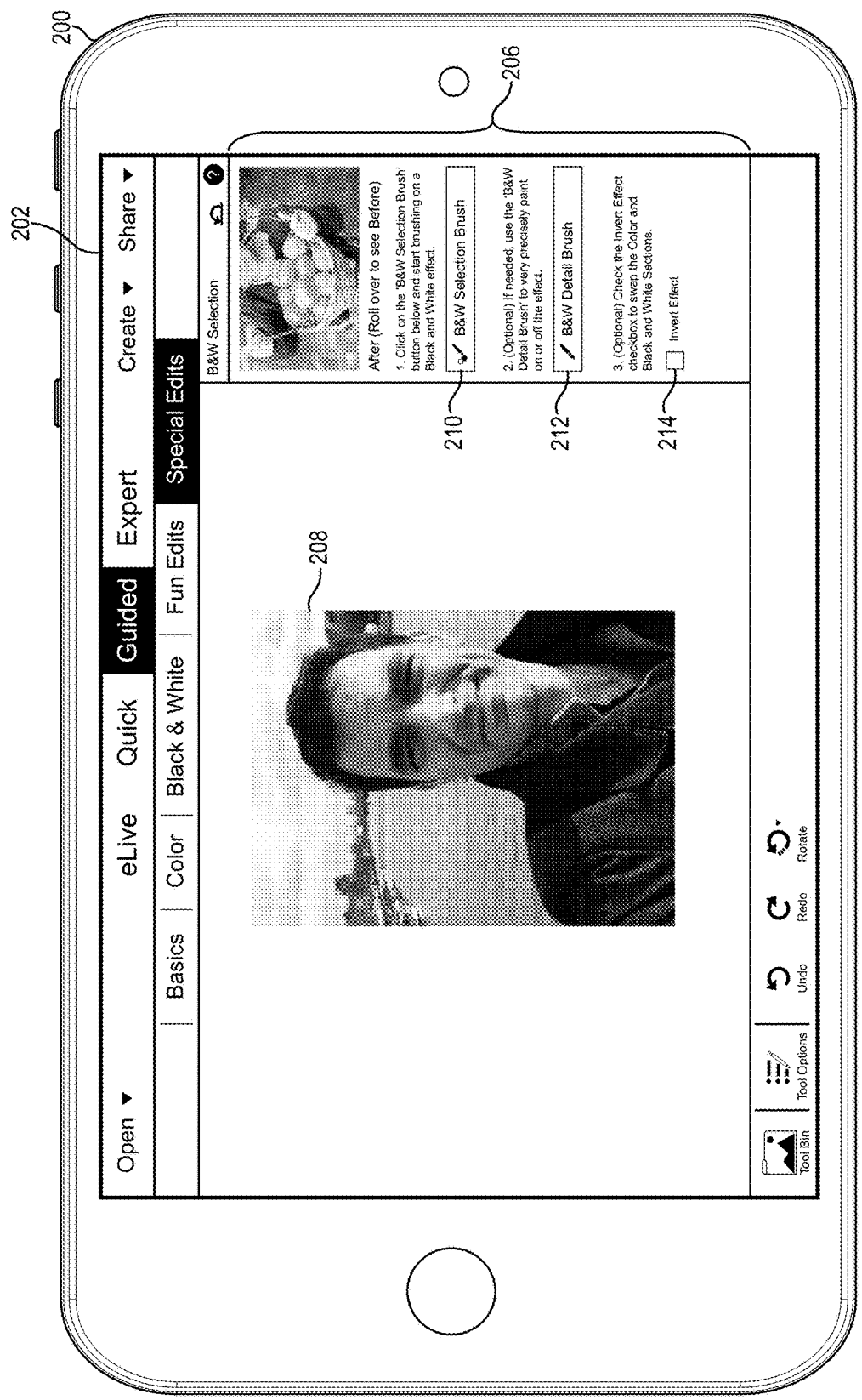

FIGS. 2A-2C illustrate a client device 200 that provides various views of GUIs in a client application 202 to facilitate the use of a workflow. In particular, FIGS. 2A-2C illustrate user interfaces for image editing software that allows a user to perform a variety of operations associated with a guided workflow. For example, selecting a workflow from the plurality of workflows in FIG. 1 causes the client application 202 to open the corresponding workflow within the user interface.

In one or more embodiments, selecting a workflow causes the client application 202 to open a workflow interface 204. As illustrated, the workflow interface 204 displays the workflow 206 with an input image 208. For example, the workflow interface 204 displays a dialog to select a file for importing into the workflow interface 204. After the user selects an input image to import into the workflow interface 204, the workflow interface 204 displays the input image 208 and allows the user to edit the input image 208 based on the workflow 206.

As mentioned, the user can select an option to enable a learning mode for a particular workflow. In one or more embodiments, the client application 202 displays the workflow in a sidebar of the workflow interface 204 next to the input image. The sidebar includes the workflow with one or more steps for obtaining an output image with an effect associated with the workflow. Although FIGS. 2A-2C illustrate the workflow 206 in a sidebar of the workflow interface 204, the client application 202 can display a workflow in any location of the workflow interface 204. For example, the workflow can be in a pop-out window or toolbar that a user can move to any location of a user interface on the client device.

In one or more embodiments, opening the workflow in learning mode personalizes the view of the workflow for the user. Specifically, the application management system determines whether the user is a beginner user or an advanced user of the client application 202 and/or the particular commands associated with the workflow. For example, the application management system determines whether the user has used the client application 202, the workflow, or one or more of the commands associated with the workflow prior to opening the workflow. Based on the user's previous experience or lack of experience with the client application 202, the workflow, and/or the commands associated with the workflow, the application management system determines how to customize the workflow for the user.

According to one or more embodiments, the application management system identifies one or more steps to hide when displaying the workflow based on whether the steps are required steps or optional steps. Specifically, required steps are the minimum steps that the user must take to obtain an output associated with the workflow. A workflow can include one or more required steps based on the desired output, the input, and/or the type of client application 202. For example, different workflows that achieve different results have a different number of required steps. To illustrate, the workflow 206 of FIG. 2A includes a single required step 210, while other workflows can include a plurality of required steps.

In addition to one or more required steps, a workflow can have one or more optional steps. An optional step is a step that a user may perform within the workflow to enhance or otherwise make further modifications to the output of the workflow. For example, a workflow can include one or more optional steps that allow the user to modify or enhance the result of the required steps to produce an enhanced output of the workflow. To illustrate, the "B&W Selection" workflow 206 illustrated in FIGS. 2A-2C includes additional, optional steps that allow the user to enhance the output of the workflow 206. Specifically, the workflow 206 includes a first optional step 212 ("B&W Detail Brush" illustrated in FIG. 2B) and a second optional step 214 ("Invert Effect" illustrated in FIG. 2C).

When determining which steps to hide when displaying a workflow, the application management system identifies the required steps of the workflow so that the client application 202 displays at least the required steps with the workflow. The application management system also identifies one or more optional steps of the workflow and hides the optional steps for a new user. For example, the application management system hides all of the optional steps 212, 214 when displaying the workflow 206 for a new user, such that the client application 202 displays only the required steps (e.g., required step 210), as shown in FIG. 2A.

In one or more additional embodiments, if the application management system determines that the user is not experienced with the client application 202, the workflow, and/or the underlying commands, the application management system modifies the workflow. FIG. 2A illustrates a workflow 206 ("B&W Selection") that the application management system simplified for display with a learning mode of the workflow 206. In particular, if the user is an inexperienced user, the application management system modifies the workflow 206 to include fewer steps. For example, the application management system identifies one or more steps in the workflow 206 and hides the identified steps to create a simplified version of the workflow 206. As shown, the simplified version of the workflow 206 includes a step of "B&W Selection Brush" to change portions of an image from color to black and white.

The application management system determines whether to hide an optional step in a workflow based on whether the user has experience with the underlying command associated with the optional step. Specifically, the application management system can factor in the user's previous use or lack of use of a command associated with an optional step in determining whether the user is experienced with the step. For example, if the user has not previously used a command associated with the optional step, the application management system determines that the user is not experienced and hides the optional step to simplify the workflow. Alternatively, if the user has previously used a command associated with an optional step one or more times, the application management system determines that the user is experienced with the step and displays the step in the workflow. Thus, the application management system provides more or less detail in the workflow based on whether the user is likely to be able to understand the steps of the workflow.

In one or more embodiments, while the application management system causes the client application 202 to hide (or prevent from displaying) optional steps, the application management system always causes the client application 202 to display required steps of the workflow. For example, because the required steps are necessary for the user to complete the workflow, the application management system may cause the client application 202 to display the required steps regardless of whether the user is experienced with the required steps. Thus, for new users, one or more embodiments of the application management system cause the client application 202 to display the required steps while hiding the optional steps of the workflow for new users who have never used the client application 202 and/or workflow.

In one or more embodiments, as the user becomes more familiarized with a workflow, the application management system further modifies the workflow. In particular, the user can become familiarized with a workflow by using commands associated with the workflow. For example, as a user uses a command associated with a hidden step in the workflow, the application management system determines that the user has become more experienced with the command. Based on the increased familiarity of the user with the command, the application management system causes the client application 202 to display the step associated with the command in the workflow.

FIG. 2B illustrates a modified version of the workflow 206 of FIG. 2A to include a first optional step 212. As mentioned, the "B&W Selection" workflow 206 includes an optional step that was previously hidden. The application management system causes the client application 202 to display the optional step 212 ("B&W Detail Brush") in response to determining that the user has become familiarized with the corresponding command. To illustrate, as the user uses a command associated with the "B&W Detail Brush" step (e.g., by using the command in the "Expert" mode of the client application 202, with another workflow, or otherwise), the application management system determines that the user is more experienced with the command. The next time the user opens the "B&W Selection" workflow 206, the application management system causes the client application 202 to display the required step 210 ("B&W Selection Brush") as well as the first optional step 212 ("B&W Detail Brush"). Alternatively, the application management system dynamically modifies a workflow while the workflow is open so that a hidden step is dynamically surfaced/displayed while the workflow is already open based on user interactions in the client application 202.

FIG. 2C illustrates a view of the workflow 206 including all of the optional steps of the workflow 206. Specifically, the application management system determines that the user has become familiarized with all of the commands associated with the optional steps of the workflow 206. The application management system then causes the client application 202 to display a second optional step 214 ("Invert Effect") that was previously hidden in addition to the required step 210 and the first optional step 212.

As illustrated in FIGS. 2A-2C, the application management system dynamically hides and/or shows steps of a workflow one at a time. Alternatively, the application management system dynamically hides and/or shows a plurality of steps of a workflow at the same time. In particular, the application management system can determine that the user has become familiarized with more than one optional step of a workflow. For example, if the optional steps are hidden when displaying the workflow a first time, the application management system can determine that the user has become familiarized with the optional steps prior to displaying the workflow a second time. Thus, when the client application 202 displays the workflow the second time, both of the optional steps are visible with the workflow.

As previously mentioned, the application management system assigns weights to steps in a workflow for determining whether to display the steps. As used herein, the terms "weight" and "score" refer to values assigned to workflow steps or corresponding commands in a client application that allow the application management system to determine whether to display the workflow steps. In one or more embodiments, the application management system determines whether a step is a required step or an optional step based on user input when creating the workflow. For example, a user or developer creating the workflow can designate whether each step in the workflow is required or optional. Identifying each step in a workflow as required or optional when creating the workflow allows the application management system to determine how to assign weights to each step in the workflow. Alternatively, the application management system can identify required steps based on an order in which the user adds the steps or by automatically determining that certain steps are necessary for generating a certain result.

According to one or more embodiments, the application management system assigns weights to the steps in a workflow based on whether the steps are required steps or optional steps. For example, when creating the workflow, the application management system assigns a first weight to one or more required steps and a second weight to one or more optional steps. To illustrate, the first weight associated with the required step(s) is higher than the second weight associated with the optional step(s). Thus, initially the application management system assigns an equal weight to each of the required steps, and an equal (lower) weight to each of the optional steps. Alternatively, the initial weights for each of the required steps or optional steps can be unequal.

When the application management system receives a request to display the workflow, the application management system compares the assigned weights to a predetermined threshold. In particular, the predetermined threshold allows the system to determine when to display a particular step with the workflow. For example, if the weight assigned to a step meets the predetermined threshold, the application management system causes the client application to display the step with the workflow. If the weight does not meet the predetermined threshold, the system hides the step or otherwise prevents the step from displaying when displaying the workflow.

In one or more embodiments, after assigning the weights to the steps of one or more workflows, the application management system creates a mapping of optional steps to workflows. Specifically, the application management system determines which steps in a workflow are optional and maps the optional steps to a name or ID of the workflow. The application management system can maintain the mappings of optional steps to workflow names/IDs in a table or other database structure.

Additionally, the steps in a workflow are associated with commands of the client application. In particular, each of the steps in a given workflow is associated with a specific command of the client application, such that performing the step involves executing a command associated with the step. For example, selecting an element associated with a step in a workflow causes the client application to execute the corresponding command. To illustrate, the workflow of FIGS. 2A-2C include three different steps associated with three different commands. By mapping the steps to the workflow name, the application management system maps each step in a workflow to workflow name, thereby mapping the workflow to the corresponding commands.

In one or more embodiments, the application management system also creates a mapping between the workflow and information about the weights of the steps of the workflow. Specifically, the application management system tracks user interactions with the commands associated with the steps in a workflow. The application management system modifies the weights of the steps in response to the user interactions with the commands. The mapping between the workflow name/ID and the weights of the steps of the workflow allow the system to determine when to display previously hidden steps in the workflow.

By mapping the workflows to the optional steps and also to information about the weights of the steps in the workflows, the application management system can manage a plurality of different workflows, each including a plurality of steps. Specifically, the system is able to monitor user interactions with a plurality of commands of the client application and determine how to display steps in a plurality of different workflows based on the monitored user interactions. For example, if a user uses a first command one or more times, the application management system can increase the weight of the command and determine whether to display a step associated with the command in a workflow that includes the step.

Additionally, if a command is associated with steps in different workflows, the application management system can determine whether to display the steps in the different workflows. For example, the system determines whether to display the steps based on the mapping of the command to each workflow name/ID due to the increased weights of the steps that are associated with the command. In one or more implementations, the application management system assigns a weight to the command, such that increasing the weight of the command increases the weight of each step in a plurality of different workflows. Alternatively, the application management system can assign a weight to steps corresponding to the command in different workflows. Thus, the application management system makes a determination of whether to show steps associated with a command collectively or individually within separate workflows.

In one or more embodiments, different workflows include different required steps and optional steps. For example, a step associated with a command can be a required step in a first workflow while being an optional step in a second workflow. Based on user interactions, the application management system uses the mappings between the workflows, steps, and weights to determine how to modify weights associated with different steps across a plurality of workflows. Thus, if a user uses a required step in a first workflow, the application management system modifies a weight associated with an optional step in a second workflow. To illustrate, if a first workflow includes the "B&W Selection Brush" as a required and an optional step in a second workflow, execution of the command in the first workflow can affect whether the optional step is displayed in the second workflow.

In one or more additional embodiments, use of commands in a different interface within the client application also affects the weights of the corresponding steps in one or more workflows. Specifically, the application management system tracks user interactions with the workflow interface 204. For example, the application management system can detect when a user executes a command in any interface (e.g., an expert or advanced interface) within the client application and modify the weights of steps associated with the executed command in one or more workflows. When the user opens the corresponding workflows after using the commands in another interface, the application management system modifies the workflows to show hidden steps if the weights of the hidden steps meet the predetermined threshold.

One or more embodiments of the application management system allow the user to use a command a predetermined number of times before the weight of steps associated with the command meet the predetermined threshold. In particular, the application management system can increase the weight of a step associated with a command by a set amount each time a user executes the command. For example, the application management system may increase the weight of a step by an amount that requires the user to execute the command a plurality of times before the weight meets the predetermined threshold. Alternatively, the application management system can require the user to execute the command a single time before the weight meets the predetermined threshold.

One or more embodiments of the application management system modify weights associated with one or more steps of a workflow based on a complexity or ease of use of the steps. For example, some commands may be more difficult to understand or use correctly. For more difficult/complex steps, the application management system can require the user to execute the corresponding commands more times than steps that are easier/simpler to use or understand. The application management system can vary the amount of interaction that a user has with different commands prior to displaying steps associated with the commands in one or more workflows to ensure that the user is familiar with the commands.

In one or more embodiments, the application management system reduces weights associated with optional steps after an amount of time passes without use. Specifically, the application management system can detect whether a user is using a workflow and/or the commands associated with the workflow. If the user has not used the workflow or the underlying commands for a predetermined amount of time, the application management system reduces the weights of the optional steps in the workflow. The reduced weights of the steps can cause the client application to re-hide the optional steps in the workflow the next time the user opens the workflow if the weights of the optional steps drop below the predetermined threshold. Alternatively, the application management system can fix the weights of the optional steps when the corresponding weights reach the predetermined threshold, or when the weights reach a second threshold that is higher the predetermined threshold for displaying the steps with the workflow.

The application management system can also modify weights of steps in a workflow based on user interactions with the workflow itself. For instance, if a user frequently uses a particular workflow, the application management system increases weights associated with hidden steps of the workflow based on the user's interactions with the workflow. Thus, even if the user does not use the underlying commands associated with the hidden steps, the application management system can display the steps if the user has performed the steps in the workflow a predetermined number of times. In one or more implementations, the application management system increases the weights of hidden steps of a workflow based on user interactions with the workflow less than if the user executed the commands associated with the hidden steps.

In one or more embodiments, the application management system allows a user to operate in both a guided (workflow) interface and an expert interface. In particular, a user can open a workflow and perform one or more steps in the workflow and also switch to an expert interface while keeping the workflow open/active. The user can switch between the workflow and the expert interface to perform steps of the workflow and also execute commands of the client application that are not in the workflow. For example, a user can open the "B&W Selection" workflow, and while the workflow is open, the user can switch to the expert interface to use a command associated with the hidden "B&W Detail Brush" step. The user can then switch back to the workflow interface 204 and continue using the open workflow.

In one or more embodiments, using a command associated with an optional step in a hidden step of an open workflow increases the weight of the hidden step greater than for a workflow that is not open. Specifically, the application management system can determine that a user is executing commands related to an open workflow. Based on the relationship between the executed commands and the open workflow, the application management system increases the weight of the corresponding step(s) in the open workflow a first amount and increase the weight of steps in workflows that are not open a second amount less than the first amount.

In one or more embodiments, the application management system differentiates between users' experiences in the client application based on user profile information. In particular, the application management system stores information associated with user interactions and workflows for a user in a user profile. The application management system can assign a user ID to each user that uses the client application. When a user signs in, the application management system can track user interactions for the user based on the user ID. Additionally, the application management system can store workflow information (e.g., step weights) with the user profile for determining how to display each workflow to the user.

As described above, the application management system applies weights to steps in each workflow based on whether the steps are required steps or optional steps. Additionally, the application management system modifies the weights of the optional steps based on user interactions with the underlying commands of the optional steps. An embodiment of an algorithm for determining and modifying step weights is described as follows:

1. A workflow includes the following steps and corresponding commands:
    i.) Step1: Cmd1
    ii.) Step2: Cmd2 [required]
    iii.) Step3: Cmd3
    iv.) Step4: Cmd4
    For example, commands in an image editing client application can include: _cBlackAndWhite; _cVibranceAdjustment; _cToneCurves; _cMatchColor; _cAutoColor; _cMakeBackgroundFromLayer; _cLevelsLayer; _cHueSatLayer; _cPosterizeLayer; _cBakcLightLayer
2. Dynamic classification of the workflow steps as optional or required results in identifying steps 1, 3, and 4 as optional and step 2 as required as shown:
    i.) Step1: Cmd1 [optional] [weight: 0]
    ii.) Step2: Cmd2 [required] [weight: 4 k]
    iii.) Step3: Cmd3 [optional] [weight: 0]
    iv.) Step4: Cmd4 [optional] [weight: 0]
    The application management system gives required steps a weight of 4 k and optional steps a weight of 0.
3. Each activity in the client application executes a particular command. Based on user activity in the client application, the application management system searches a mapping of optional commands to workflow names to find a workflow.
4. For each workflow, the application management system searches a mapping of workflow names to steps to identify the steps associated with the command. The application management system increases the weight of the identified steps by a factor of k/2 in each workflow upon the user using the underlying command.
5. The application management system also increases the optional step weight by an additional factor of k/2 for a particular workflow (e.g., an open/active workflow).

Thus, the effective increase in weight for the optional step in the particular workflow is k (i.e., k/2+k/2).

6. The application management system then determines whether to display steps in a workflow based on whether the weights of the steps meets the predetermined threshold (e.g., 4 k). Steps that meet the threshold are displayed (i.e., provided in the user interface) and steps that do not meet the threshold are hidden (i.e., not provided in the user interface).

Figure 3:
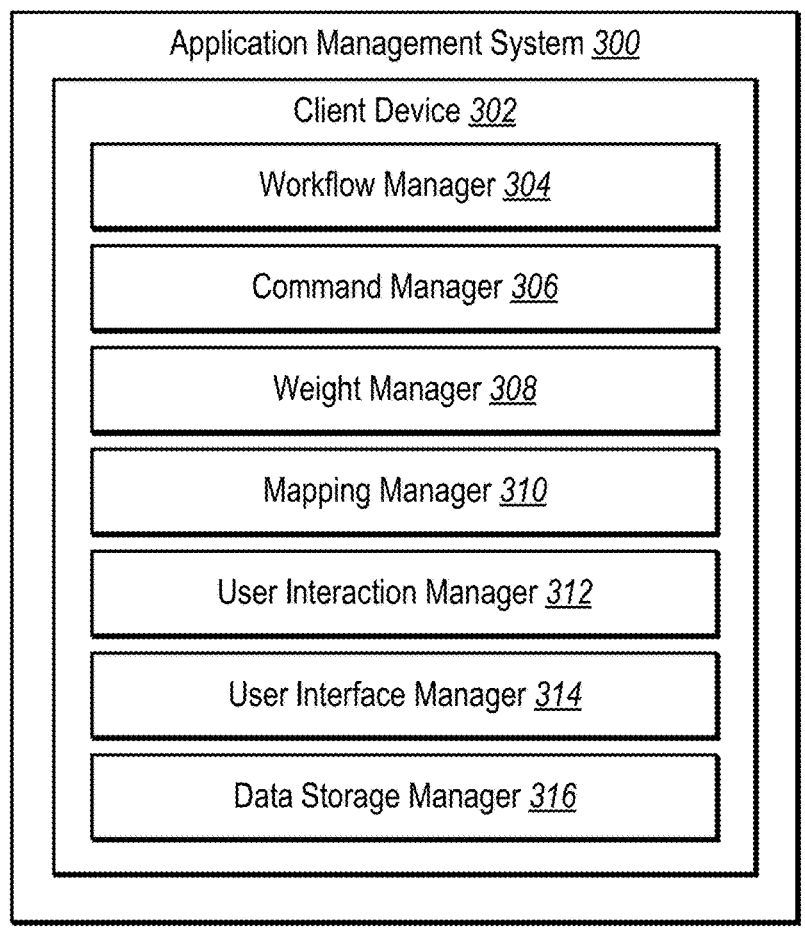
FIG. 3 illustrates a schematic diagram of an application management system in accordance with one or more embodiments.

By weighting steps in a workflow and adjusting the weights based on user interactions with underlying commands, the application management system provides a customized workflow experience to match the user's familiarity with the steps/commands in the workflow. FIG. 3 illustrates a schematic diagram of an application management system 300 on a client device 302 for performing one or more operations of the application management system 300 described herein. The application management system 300 include sa workflow manager 304, a command manager 306, a weight manager 308, a mapping manager 310, a user interaction manager 312, a user interface manager 314, and a data storage manager 316. Although the application management system 300 of FIG. 3 is depicted as having various components, the application management system 300 may have any number of additional or alternative components. Additionally, although FIG. 3 illustrates the application management system 300 including the components on a single client device 302, the application management system 300 can include one or more of the illustrated components on a plurality of client devices.

Although the components of the application management system 300 are shown to be separate in FIG. 3, any of the components may be combined into fewer components, such as into a single component, or divided into more components as may serve a particular implementation. Furthermore, although the components of FIG. 3 are described in connection with the application management system 300, at least some of the components for performing operations in conjunction with the application management system 300 described herein may be implemented on other devices and/or with other systems.

In one or more embodiments, each of the components of the application management system 300 can be in communication with one another using any suitable communication technologies. Although the components of the application management system 300 are shown to be separate in FIG. 3, any of the components may be combined into fewer components, such as into a single component, or divided into more components as may serve a particular implementation. Furthermore, although the components of FIG. 3 are described in connection with the application management system 300, at least some of the components for performing operations in conjunction with the application management system 300 described herein may be implemented on other devices and/or with other systems.

The components of the application management system 300 can include software, hardware, or both. For example, the components of the application management system 300 (e.g., the workflow manager 304, the command manager 306, the weight manager 308, the mapping manager 310, the user interaction manager 312, the user interface manager 314, and the data storage manager 316) can include on or more instructions stored on a computer-readable storage medium and executed by processors of one or more computing devices such as the client device 302. When executed by the one or more processors, the computer-executable instructions of the application management system 300 can cause the computing devices to perform the dynamic workflow processes described herein. Alternatively, the components of the application management system 300 can comprise hardware, such as a special purpose processing device to perform specific functions associated with workflow processes. Additionally, the components of the application management system 300 can comprise a combination of computer-executable instructions and hardware.

Furthermore, the components of the application management system 300 performing the functions described herein may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the application management system 300 may be implemented as part of a stand-alone application on a personal computing device or a mobile device. Alternatively or additionally, the components of the application management system 300 may be implemented in any application that allows delivery of content to users, including, but not limited to, applications in ADOBE® CREATIVE CLOUD®, ADOBE® PHOTOSHOP®, and PHOTOSHOP ELEMENTS®. "ADOBE", "CREATIVE CLOUD", "PHOTOSHOP", and "PHOTOSHOP ELEMENTS" are registered trademarks of Adobe Systems Incorporated in the United States and/or other countries.

As previously described, the application management system 300 includes a workflow manager 304 to facilitate the management of workflows in a client application on the client device 302. Specifically, the workflow manager 304 allows the client device 302 to create and store workflows for performing one or more actions and/or for achieving a result. For example, the workflow manager 304 allows a user to create a workflow that includes one or more steps that are associated with commands of the client application. As mentioned, a workflow can include at least one required step and at least one optional step.

The application management system 300 also includes a command manager 306 that facilitates management of commands in the client application. In particular, the command manager 306 identifies and manages a list of commands associated with one or more workflows in the client application. For example, the command manager 306 determines identifiers and/or execution codes for commands that cause the client application to perform a specific operation. The command manager 306 can also determine when a command is executed by communicating with the user interaction manager 312 and store execution information with the command.

Additionally, the application management system 300 includes a weight manager 308 to manage weights/scores associated with commands and/or workflow. In one or more embodiments, the weight manager 308 generates and manages weights for a plurality of steps associated with a plurality of workflows. In one or more alternative embodiments, the weight manager 308 generates and manages weights for underlying commands associated with the plurality of steps. In either case, the weight manager 308 also increases weights associated with commands or steps based on user interactions by communicating with the user interaction manager 312.

The application management system 300 also includes a mapping manager 310 to map the workflows of the client application to various other elements of the client application. Specifically, the mapping manager 310 maps workflow names to commands in the client application. Additionally, the mapping manager 310 maps workflow names to optional steps in the different workflows. Thus, the mapping manager 310 can map commands to optional steps in a plurality of different workflows indirectly via a plurality of mappings.

The application management system 300 includes a user interaction manager 312 to facilitate detection of user interactions in the client application. In particular, the user interaction manager 312 detects a user input to perform a command or activity in the client application. For example, the user interaction manager 312 identifies a user input from a user input device and identify the command associated with the user interaction. The communication manager can communicate with the command manager 306 and the weight manager 308 to send user interaction information for use in determining weights associated with the commands/workflows.

Additionally, the application management system 300 includes a user interface manager 314 to facilitate the display of information on a display device. Specifically, the user interface manager 314 displays workflows in a user interface on the display device based on a user selection of the workflows. Additionally, the user interface manager 314 determines which steps of the workflows to display based on the weights associated with the steps of the workflows. For example, the user interface manager 314 determines which steps in a workflow to display by communicating with the weight manager 308 and the mapping manager 310 to determine whether weights associated with steps in a given workflow meet a predetermined threshold.

The application management system 300 also includes a data storage manager 316 to manage data that the other components in the application management system 300 use and/or produce. Specifically, the data storage manager 316 can communicate with the other components in the application management system 300 (i.e., the workflow manager 304, the command manager 306, the weight manager 308, the mapping manager 310, the user interaction manager 312, and the user interface manager 314) to obtain data that the components have produced for storage and/or use by one or more of the components. To illustrate, the data storage manager 316 can store data that includes, but is not limited to, workflows, steps in workflows, commands, weights/scores associated with steps and commands, user profiles, and/or other information associated with the operation of the application management system 300.

FIGS. 1-3, the corresponding text, and the examples, provide a number of different systems and devices for providing guided workflows. In addition to the foregoing, embodiments can be described in terms of flowcharts comprising acts and steps in a method for accomplishing a particular result. For example, FIGS. 4 and 5 illustrate flowcharts of exemplary methods in accordance with one or more embodiments.

Figure 4:
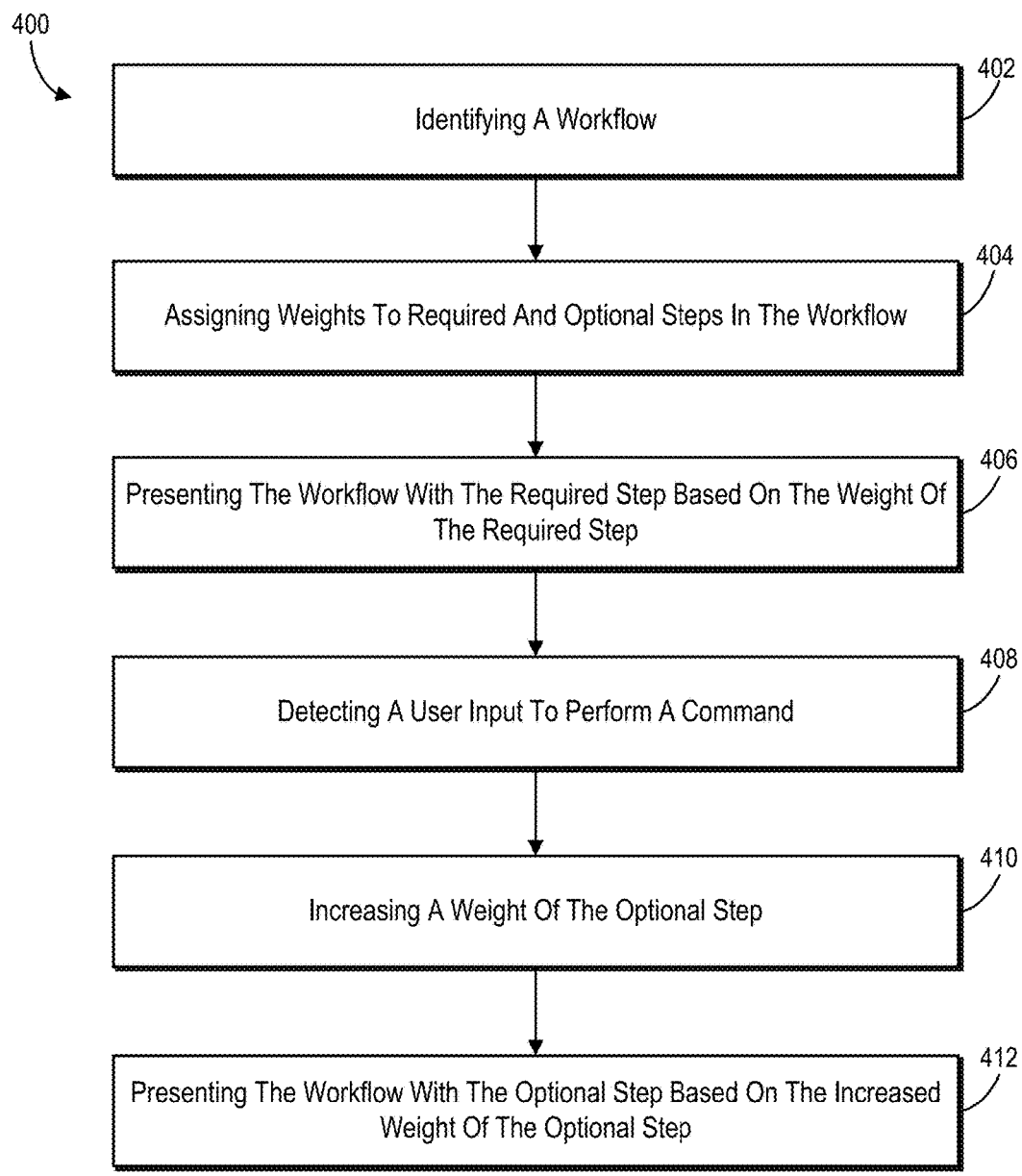
FIG. 4 illustrates a flowchart of a series of acts in a method of dynamically modifying controls of a workflow in accordance with one or more embodiments.
Figure 5:
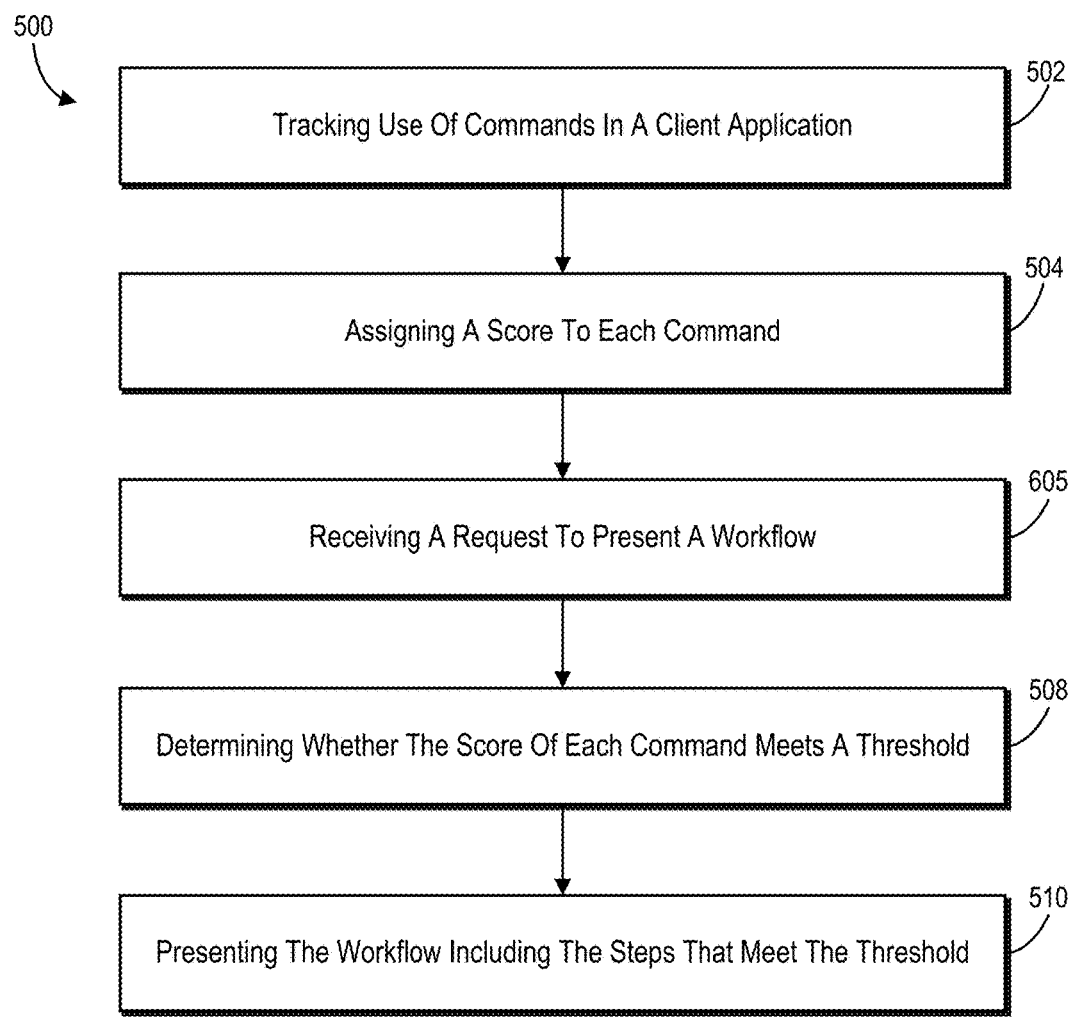
FIG. 5 illustrates a flowchart of a series of acts in another method of method of dynamically modifying controls of a workflow in accordance with one or more embodiments.

FIG. 4 illustrates a flowchart of a series of acts in a method 400 of dynamically modifying a workflow. The method 400 includes an act 402 of identifying a workflow. For example, act 402 involves identifying, within a client application, a first workflow comprising a plurality of steps, the plurality of steps comprising a required step and an optional step. Act 402 can also involve identifying a plurality of workflows comprising an optional step associated with the command.

The method 400 also includes an act 404 of assigning weights to required and optional steps in the workflow. For example, act 404 involves assigning a first weight to the required step and a second weight to the optional step, wherein the first weight meets a predetermined threshold and the second weight does not meet the predetermined threshold. Act 404 can involve assigning a weight of zero to the optional step for initially presenting the first workflow. Alternatively, act 404 can involve assigning a weight to the optional step based on an ease of use of the optional step.

The method 400 also includes an act 406 of presenting the workflow with the required step based on the weight of the required step. For example, act 406 involves presenting the first workflow including the required step based on the first weight meeting the predetermined threshold and excluding the optional step based on the second weight not meeting the predetermined threshold. Act 406 can involve presenting the first workflow in response to a user request to display the first workflow.

Additionally, the method 400 includes an act 408 of detecting a user input to perform a command. For example, act 408 involves detecting a user input to perform a command associated with the optional step in the client application. Act 408 can involve detecting a user input to perform a command in connection with a user interface tool in the client application. Act 408 can also involve detecting a user input to perform a required step associated with the command in a second workflow.

The method 400 further includes an act 410 of increasing a weight of the optional step. For example, act 410 involves increasing, in response to the detected user input, the second weight assigned to the optional step. Act 410 can involve increasing the second weight assigned to the optional step in the first workflow a plurality of times in response to a plurality of detected user inputs to perform the command associated with the optional step in the first workflow, comparing the second weight to the predetermined threshold after each time from the plurality of times, and presenting, in the graphical user interface, the first workflow including the optional step in response to the second weight meeting the predetermined threshold.

As part of act 410, or as an additional act, the method 400 can include increasing a weight assigned to the optional step in each workflow from a plurality of workflows in response to the detected user input. For example, the method 400 can include increasing a weight assigned to the optional step an equal amount in each workflow that is not active from the plurality of workflows.

As part of act 410, or as an additional act, the method 400 can include detecting a user input to perform the required step in the first workflow, and increasing, in response to the detected user input to perform the required step, the second weight assigned to the optional step by a factor that is less than a factor associated with increasing the second weight assigned to the optional step in response to the detected user input to perform the command associated with the optional step.

The method 400 also includes an act 412 of presenting the workflow with the optional step based on the increased weight of the optional step. For example, act 412 involves presenting, in the graphical user interface, the first workflow including the optional step based on the increased second weight meeting the predetermined threshold. Act 412 can involve presenting the first workflow in response to a request to display the first workflow after determining that the second weight meets the predetermined threshold. Act 412 can alternatively involve presenting the first workflow in response to a request to display the first workflow upon determining that the second weight meets the predetermined threshold while the first workflow is active.

The method 400 can also include determining that the command is associated with an optional step in a second workflow, and increasing a weight assigned to the optional step in the second workflow in response to the detected user input. Additionally, the method 400 can include determining that the first workflow is active when the user input to perform the command is detected, wherein the second workflow is not active, and increasing the second weight assigned to the optional step in the first workflow with a factor greater than an increase factor of the weight associated with the optional step in the second workflow.

FIG. 5 illustrates a flowchart of a series of acts in a method 500 of guiding user performance of a workflow. The method 500 includes an act 504 of tracking use of commands in a client application. For example, act 504 involves tracking use of a plurality of commands in a client application. Act 504 can involve detecting an executed command from the plurality of commands based on a user input, and storing information about execution of the executed command with the executed command. To illustrate, detecting an executed command can involve detecting a selection of a user interface tool associated with the executed command.

Act 504 can involve tracking user interactions with user interface tools or user interface elements in the client application in connection with a user profile. For example, act 504 can involve assigning a user ID to the user profile and associating one or more user interactions with the user ID.

As part of act 504, or as an additional act, the method 500 can include detecting an executed command from the plurality of commands, identifying a first mapping between the executed command and a workflow, identifying a second mapping between the workflow and an optional step in the workflow, the optional step associated with the executed command, and associating a score assigned to the executed command with the optional step in the workflow.

The method 500 also includes an act 504 of assigning a score to each command. For example, act 504 involves assigning, based on the tracked use of the plurality of commands, a score to each command from the plurality of commands. Act 504 can also involve determining that a command from the plurality of commands is associated with a required step in a workflow, and assigning a score to the command based on the command being associated with the required step. Additionally, act 504 can involve determining that a command from the plurality of commands is associated with an optional step in a workflow, and assigning a score to the command based on the command being associated with the optional step.

Additionally, the method 500 includes an act 506 of receiving a request to present a workflow. For example, act 506 involves receiving a request to present a workflow comprising a plurality of steps associated with the plurality of commands. Act 506 can involve receiving a user input to present the workflow comprising at least one required step and at least one optional step for creating or modifying content.

The method 500 also includes an act 508 of determining whether the score of each command meets a threshold. For example, act 508 involves determining whether the score of a plurality of commands associated with the workflow meets a predetermined threshold. Act 508 can involve individually comparing the score of each command from the plurality of commands in the workflow to the predetermined threshold. The predetermined threshold can include a threshold associated with displaying steps in a workflow.

The method 500 further includes an act 510 of presenting the workflow including the steps that meet the threshold. For example, act 510 involves presenting, in a graphical user interface, the workflow including one or more steps from the plurality of steps based on corresponding one or more commands from the plurality of commands meeting the predetermined threshold.

The method 500 can also include increasing a score of the executed command based on stored information about execution of an executed command from the plurality of commands. The method 500 can include determining that the increased score of the executed command meets the predetermined threshold, and presenting the workflow including an optional step associated with the executed command based on the increased score of the executed command meeting the predetermined threshold.

Alternatively, the method 500 can include determining that the increased score of the executed command does not meet the predetermined threshold, and preventing from displaying an optional step associated with the executed command with the workflow based on the increased score of the executed command not meeting the predetermined threshold.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
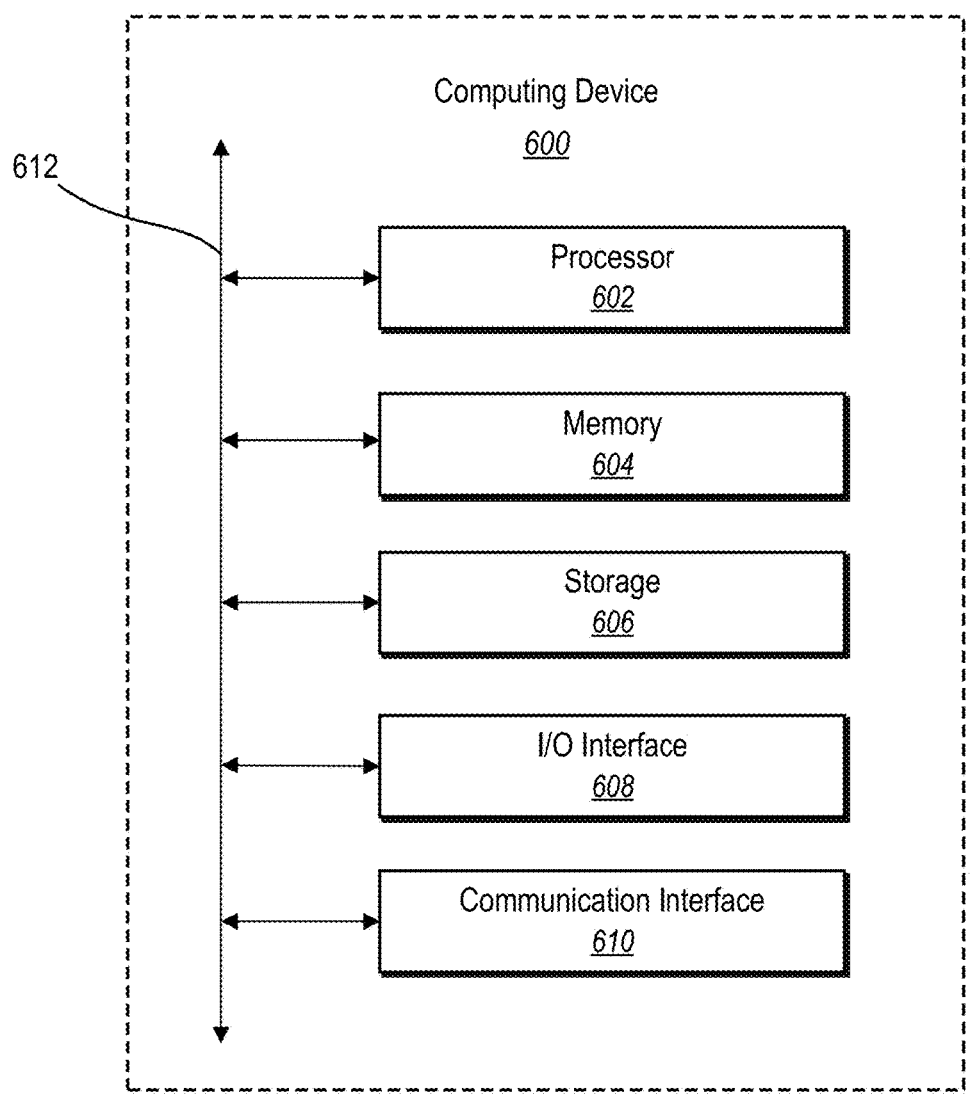
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the application management system 300. As shown by FIG. 6, the computing device 600 can comprise a processor 602, a memory 604, a storage device 606, an I/O interface 608, and a communication interface 610, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions for dynamically modifying workflows, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions related to dynamically modifying workflows (e.g., workflows, steps, weights/scores).

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wirebased network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the digitizing processes described herein. To illustrate, the dynamic workflow process can allow a plurality of devices (e.g., a client device and server devices) to exchange information using various communication networks and protocols for exchanging workflow information such as new workflows, steps, or shared workflows.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for editing digital content, a method of dynamically modifying guided workflows for editing digital content comprising:
   identifying, within a client application, a first workflow comprising a plurality of steps corresponding to a plurality of user interface tools, the plurality of steps comprising a required step and an optional step;
   assigning, by at least one processor, a first weight to the required step and a second weight to the optional step, wherein the first weight meets a predetermined threshold and the second weight does not meet the predetermined threshold;
   presenting, in a graphical user interface, the first workflow including a user interface tool for the required step based on the first weight meeting the predetermined threshold and excluding a user interface tool for the optional step based on the second weight not meeting the predetermined threshold;
   detecting, by the at least one processor, a user input to perform a command associated with the optional step in the client application;
   increasing, by the at least one processor and in response to the detected user input, the second weight assigned to the optional step;
   detecting a user input to perform the required step in the first workflow;
   increasing, in response to the detected user input to perform the required step, the second weight assigned to the optional step by a factor that is less than a factor associated with increasing the second weight assigned to the optional step in response to the detected user input to perform the command associated with the optional step; and
   presenting, in the graphical user interface, the first workflow including the user interface tool for the optional step based on the second weight meeting the predetermined threshold.

2. The method as recited in claim 1, further comprising:
   determining that the command is associated with the optional step in a second workflow; and
   increasing a weight assigned to the optional step in the second workflow in response to the detected user input.

3. The method as recited in claim 2, further comprising:
   determining that the first workflow is active when the user input to perform the command is detected, wherein the second workflow is not active; and
   increasing the second weight assigned to the optional step in the first workflow with a factor greater than an increase factor of the weight associated with the optional step in the second workflow.

4. The method as recited in claim 2, further comprising:
   identifying a plurality of workflows comprising the optional step associated with the command; and
   increasing a weight assigned to the optional step in each workflow from the plurality of workflows in response to the detected user input.

5. The method as recited in claim 1, further comprising:
   increasing the second weight assigned to the optional step in the first workflow a plurality of times in response to a plurality of detected user inputs to perform the command associated with the optional step in the first workflow; and
   comparing the second weight to the predetermined threshold after each detected user input; and
   presenting, in the graphical user interface, the first workflow including the user interface tool for the optional step in response to the second weight meeting the predetermined threshold.

6. The method as recited in claim 1, wherein presenting the first workflow including the user interface tool for the optional step comprises presenting the first workflow in response to a request to display the first workflow after determining that the second weight meets the predetermined threshold.

7. The method as recited in claim 1, wherein presenting the first workflow including the user interface tool for the optional step comprises presenting the first workflow in response to a request to display the first workflow upon determining that the second weight meets the predetermined threshold while the first workflow is active.

8. The method as recited in claim 1, further comprising:
   determining that the command is associated with the required step in a second workflow;
   detecting a user input to perform the command in connection with the second workflow; and increasing, in response to the detected user input to perform the command in connection with the second workflow, the second weight assigned to the optional step in the first workflow.

9. The method as recited in claim 1, wherein detecting the user input to perform the command associated with the optional step comprises detecting a user input to perform the required step associated with the command in a second workflow.

10. A non-transitory computer readable storage medium comprising instructions that, when executed by at least one processor, cause a computer system to:
track use of a plurality of commands in a client application;
assign, based on the tracked use of the plurality of commands, a score to each command from the plurality of commands;
receive a request to present a workflow comprising a plurality of steps associated with the plurality of commands, the plurality of steps comprising a required step and an optional step;
detect a user input to perform the required step in the workflow;
increase, in response to the detected user input to perform the required step, a score assigned to the optional step in the workflow by a factor that is less than a factor associated with increasing the score assigned to the optional step in response to a detected user input to perform a command associated with the optional step;
determine whether the scores of a plurality of commands associated with the plurality of steps in the workflow meets a predetermined threshold; and
present, in a graphical user interface, the workflow including one or more user interface tools corresponding to one or more steps from the plurality of steps based on scores corresponding to one or more commands from the plurality of commands meeting the predetermined threshold.

11. The non-transitory computer readable storage medium as recited in claim 10, wherein the instructions that cause the computer system to detect the user input to perform the command associated with the optional step cause the computer system to:
detect an executed command from the plurality of commands;
identify a first mapping between the executed command and the workflow;
identify a second mapping between the workflow and the optional step in the workflow, the optional step associated with the executed command; and
associate a score assigned to the executed command with the optional step in the workflow.

12. The non-transitory computer readable storage medium as recited in claim 10, wherein the instructions that cause the computer system to track use of the plurality of commands cause the computer system to:
detect an executed command from the plurality of commands based on a user input; and
store information about execution of the executed command with the executed command.

13. The non-transitory computer readable storage medium as recited in claim 12, further comprising instructions that cause the computer system to increase a score of the executed command based on the stored information about execution of the executed command.

14. The non-transitory computer readable storage medium as recited in claim 13, further comprising instructions that cause the computer system to:
determine that the increased score of the executed command meets the predetermined threshold; and
present the workflow including a user interface tool corresponding to the optional step associated with the executed command based on the increased score of the executed command meeting the predetermined threshold.

15. The non-transitory computer readable storage medium as recited in claim 13, further comprising instructions that cause the computer system to:
determine that the increased score of the executed command does not meet the predetermined threshold; and
prevent from displaying a user interface tool corresponding to the optional step associated with the executed command with the workflow based on the increased score of the executed command not meeting the predetermined threshold.

16. The non-transitory computer readable storage medium as recited in claim 12, wherein the instructions that cause the computer system to detect the executed command from the plurality of commands based on the user input cause the computer system to detect a selection of a user interface tool associated with the executed command.

17. In a digital medium environment for guiding user performance of a workflow, a system comprising:
at least one processor;
a non-transitory computer readable storage medium comprising instructions that, when executed by the at least one processor, cause the system to:
detect a user interaction to perform a first command from a plurality of commands in a client application;
identify a first workflow comprising an optional step associated with the first command;
increase a weight assigned to the optional step in the first workflow;
receive a request to present the first workflow comprising the optional step;
detect a user interaction to perform a second command from the plurality of commands in the client application, the second command associated with a required step in the first workflow;
increase the weight assigned to the optional step in the first workflow by a factor that is less than a factor associated with increasing the weight assigned to the optional step in response to the detected user interaction to perform the first command associated with the optional step;
determine whether the weight assigned to the optional step in the first workflow meets a predetermined threshold; and
present, in a graphical user interface, the first workflow including a user interface tool corresponding to the optional step based on the weight assigned to the optional step meeting the predetermined threshold.

18. The system as recited in claim 17, further comprising instructions that, when executed by the at least one processor, cause the system to:
identify a second workflow comprising the optional step associated with the first command; and
increase a weight assigned to the optional step in the second workflow.

19. The system as recited in claim 18, further comprising instructions that, when executed by the at least one processor, cause the system to:

determine that the first workflow is active when the user interaction with the first command is detected;

determine that the second workflow is not active when the user interaction with the first command is detected;

increase the weight assigned to the optional step in the first workflow with a first weight factor; and increase the weight assigned to the optional step in the second workflow with a second weight factor, wherein the first weight factor is greater than the second weight factor.

20. The system as recited in claim 17, further comprising instructions that, when executed by the at least one processor, cause the system to:

detect a user interaction with a second command from the plurality of commands;

determine that the first workflow comprises an optional step associated with the second command;

increase a weight assigned to the optional step associated with the second command in the first workflow;

determine that the weight assigned to the optional step associated with the second command in the first workflow does not meet the predetermined threshold; and prevent a user interface tool for the optional step associated with the second command from being displayed with the first workflow based on the weight associated with the second command not meeting the predetermined threshold.

\* \* \* \* \*